United States Patent [19]

Andersson et al.

[11] Patent Number: 4,872,950
[45] Date of Patent: Oct. 10, 1989

[54] PROCESS FOR RECOVERING ENERGY AND CHEMICALS FROM SPENT LIQUOR IN PULP PREPARATION

[76] Inventors: Alf O. Andersson, Kofallsvägen 38, S-710 40 Frövi; Björn S. Warnqvist, Tingsvögen 44, S-183 40 Täby, both of Sweden

[21] Appl. No.: 121,795

[22] Filed: Nov. 17, 1987

[30] Foreign Application Priority Data

Nov. 28, 1986 [SE] Sweden ................ 8605116

[51] Int. Cl.$^4$ .............. D21C 11/04; D21C 11/06; D21C 11/10; D21C 11/12
[52] U.S. Cl. .................. 162/15; 162/30.1; 162/30.11; 162/31; 162/47
[58] Field of Search ............ 162/30.1, 30.11, 29, 162/31, 15, 47

[56] References Cited

U.S. PATENT DOCUMENTS

| | | | |
|---|---|---|---|
| 3,183,145 | 5/1965 | Collins, Jr. ................ | 162/15 |
| 3,873,414 | 3/1975 | Rocher et al. ............. | 162/30.11 |
| 3,920,506 | 11/1975 | Morgan ..................... | 162/31 |
| 4,111,743 | 9/1978 | Ronnholm .................. | 162/47 |
| 4,299,652 | 11/1981 | Masuno ..................... | 162/51 |
| 4,522,685 | 6/1985 | Feldmann ................... | 162/47 |

FOREIGN PATENT DOCUMENTS 53-58005  5/1978  Japan ........................ 162/29

OTHER PUBLICATIONS

Zimmermann; "New Waste Disposal Process"; *Chemical Engineering*, Aug. 25, 1958, pp. 117–120.
Thomas; "Process Simulation Program"; *TAPPI*, vol. 62, No. 2, Feb. 1979, pp. 51–57.

*Primary Examiner*—Steve Alvo
*Attorney, Agent, or Firm*—Burns, Doane, Swecker & Mathis

[57] ABSTRACT

Eenrgy and process chemicals are recovered from spent liquor in pulp preparation by thermally decomposing the spent liquor to solid and gaseous products at an elevated pressure and with addition of oxygen. The supply of oxygen should be less than that stoichiometrically required for a complete combustion and the temperature at the decomposition should be below the temperature at which a melt is formed.

After recovery of sulfur-containing compounds the gas formed can give off energy in a gas turbine, thereafter generate steam and finally be used for drying fuel which is subsequently gasified under pressure and provides a further contribution of energy in the form of a combustible gas.

Process chemicals are recovered from the solid products in known manner.

9 Claims, 2 Drawing Sheets

MAIN REACTION PRODUCTS (SULFUR-SODIUM-COMPOUNDS) FROM BLACK LIQUOR AT DIFFERENT TEMPERATURES AND AIR FEEDS

PROCESS FOR RECOVERING ENERGY AND CHEMICALS FROM SPENT LIQUOR IN PULP PREPARATION

In the preparation of pulp from cellulose-containing materials such as wood, the material is digested in a solution or liquor that does not attack the cellulose but dissolves the other organic materials of the wood, primarily lignin. Thus, after separation of the resulting pulp, the liquor will contain a considerable amount of dissolved organic materials together with the spent digestion agents. As the constituent materials have a considerable value and cannot either, for environmental reasons, be led directly to a recipient, it is necessary to recover them. In this connection it is most often intended to regenerate the digestion agents for a repeated use while the organic materials are being burned and give a contribution of energy in this way. The recovery has first of all been of importance in the sulfate pulping process but has also become important in the sulfite pulping process and other pulping processes.

A number of processes are known for the recovery of energy and chemicals in pulping processes. The one most known and used is the Tomlinson process in the sulfate industry. According to this process, the concentrated black liquor is sprayed into a soda boiler furnace where the organic components are burned, generating steam while the inorganic components form a melt of substantially sodium sulfide and sodium carbonate. After dissolution of the melt in water and causticizing of the sodium carbonate to sodium hydroxide, white liquor is again obtained which is reused for the digestion of the wood.

The Tomlinson process has been known for a long time and is well-developed. However, it has with a number of shortcomings. Thus, it is inconvenient to handle the melt, and if it gets into contact with water under unfavorable circumstances, for example due to the bursting of a boiler tube, devastating explosions may occur. Moreover, part of the sulfur used in the digestion gets lost with the flue gases in the form of oxide, and the recovery thereof is difficult. Finally, the thermal efficiency of the process is not quite satisfactory.

Attempts have been made to improve the Tomlinson process by separating the recovery of chemicals from the recovery of energy in different ways. Thus, in the Champion process (Tappi Journal, Nov. 1985, pages 106-110) concentrated black liquor is injected at the upper part of a vertical furnace and is thermally decomposed (gasified) under access of air forming a melt and a combustible gas. The melt is collected at the bottom of the furnace and discharged to the recovery of chemicals, and the gas is burned in a gas turbine or a steam boiler. This gives a better thermal efficiency and makes the process more flexible than what can be achieved in the Tomlinson process. However, there is still a melt with the difficulties in handling associated therewith.

In the SCA-Billerud process (E. Hornstedt and J. Gommi, Paper Trade Journal 158 (1974): 16, pages 32-34). the liquor is subjected to pyrolysis in a reactor under such temperature conditions that a dust substantially consisting of sodium carbonate and carbon is obtained as well as a combustible gas containing i.a. sulfur compounds. Solid and gaseous materials are separated in a wet scrubber at the same time as sulfur-containing gases are absorbed by the sodium carbonate solution formed. The remaining gases are burned in a steam boiler for recovery of energy while carbon is removed from the resulting liquid phase from the scrubber by means of filtration, after which the liquid phase is subjected to causticizing in the usual manner in order to obtain white liquor. This process has advantages thanks to its flexibility but has simultaneously the disadvantage that large quantities of carbon are formed and must be eliminated.

A process for recovery of energy and chemicals in a sulfate process is described in the international patent application PCT/SE86/00249. According to this process, the concentrated black liquor is gasified in a pressurized reactor by means of so-called "flash pyrolysis" at 700-1300° C. An energy-rich gas and a melt of substantially sodium carbonate and sodium sulfide are formed here. The melt is directly dissolved in water and the solution can be used for washing out hydrogen sulfide from the gaseous fraction, after which the green liquor thus formed is recycled to the preparation of the digesting liquor. The gas is thereafter used as a fuel for generation of steam. Thus, in this process a melt is obtained with the accompanying handling problems.

The disadvantages indicated above are eliminated by the process of the present invention. According to the invention a concentrated spent liquor from the preparation of pulp is thermally decomposed forming gaseous and solid products, the thermal decomposition being carried out with supply of oxygen in an amount below the stoichiometrically required amount, at a pressure above atmospheric and at such a temperature that no melt is formed.

BRIEF DESCRIPTION OF THE DRAWINGS

The invention is illustrated more closely in the following detailed description together with the drawing. In the drawing.

FIG. 1 shows schematically in the form of a diagram which reaction products are in the majority in gasification of black liquor concentrated to about 60% of solids at different temperatures and oxidation degrees. The principal main product is $Na_2CO_3$ across the whole area of the diagram whereas the desirable compound NaOH is substantially lacking.

Figure 1:
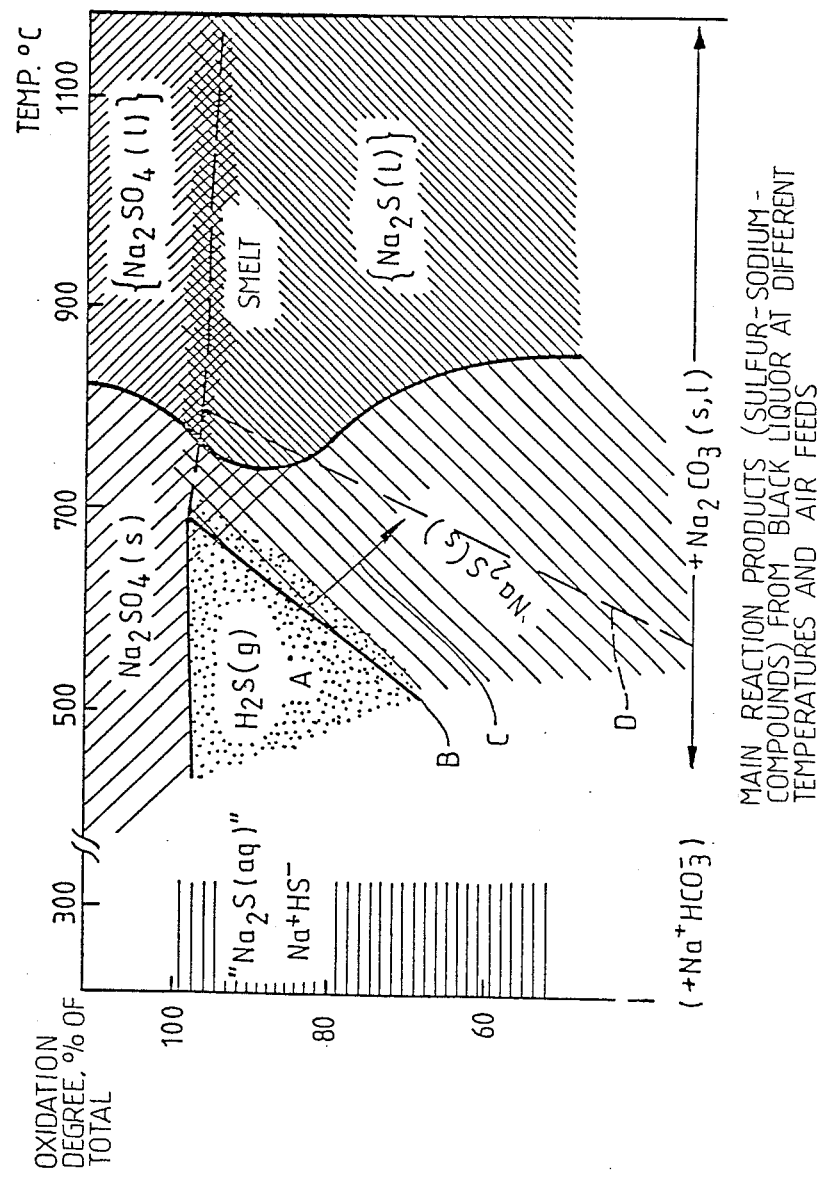
FIG. 1 shows a schematic diagram of the substantial reaction products in the thermal decomposition of black liquor at different temperatures and oxidation degrees.

The above-mentioned Tomlinson process, the Champion process and the process according to the international application PCT/SE86/00249 are operated at high temperatures in the right-hand part of the diagram, where there is a melt. On the other hand, the SCA-Billerud process is operated within the area A in the diagram where gaseous $H_2S$ is a main product.

The diagram shown refers to reactions at atmospheric pressure. It has now been found that if the reactions are carried out at an elevated pressure, the borderline B between the area of gaseous $H_2S$ and the area of liquid $Na_2S$ will be displaced to the right towards higher temperatures, as is indicated by the arrow C towards the new borderline D. By gasifying the black liquor at an elevated pressure it is thus possible to operate at higher temperatures and still obtain the main portion of the included sulfur in the form of gaseous hydrogen sulfide, at the same time as the formation of carbon from the included organic materials is suppressed due to the higher working temperature. It is also apparent that the temperature must not be raised so much that the area of a melt is entered, if this is to be avoided.

In this description it is intended by the expression "gasification" a combustion with a supply of an amount of oxygen or air that is stoichiometrically insufficient for a complete oxidation of the gasified material. By "combustion", a supply of oxygen or air sufficient for a complete oxidation is intended, while the expression "pyrolysis" relates to a thermal decomposition without access of oxygen or air.

According to the invention, the thermal decomposition is suitably carried out at a pressure of 10–50 bar and preferably at 15–25 bar. The temperature should be between about 700° and about 850° C. and preferably between about 740° and about 800° C. At higher temperatures there is a risk of entering the area of a melt and at lower temperatures the formation of carbon from the organic materials in the liquor will be increasingly troublesome.

Furthermore, the thermal decomposition according to the invention should be carried out with a supply of oxygen corresponding to an oxidation degree of 5–75% of the stoichiometric value for a complete oxidation, and preferably 30–50%. In the thermal decomposition, oxygen-containing products are also formed which contribute to the oxidation reactions, and the amount of oxygen supplied must be corrected with respect to this. Furthermore, corrections for the oxygen content must also be made when air or oxygen-enriched air is supplied instead of pure oxygen gas. Of course it is also possible to supply air as well as oxygen through two different conduits, and also here corrections must be made so that the totally supplied amount of oxygen is within the indicated limits. As the oxygen supply is lower than that stoichiometrically required, it is ensured that reducing conditions will prevail at the gasification and that consequently no significant amounts of sulfur dioxide or sulfate are formed.

Figure 2:
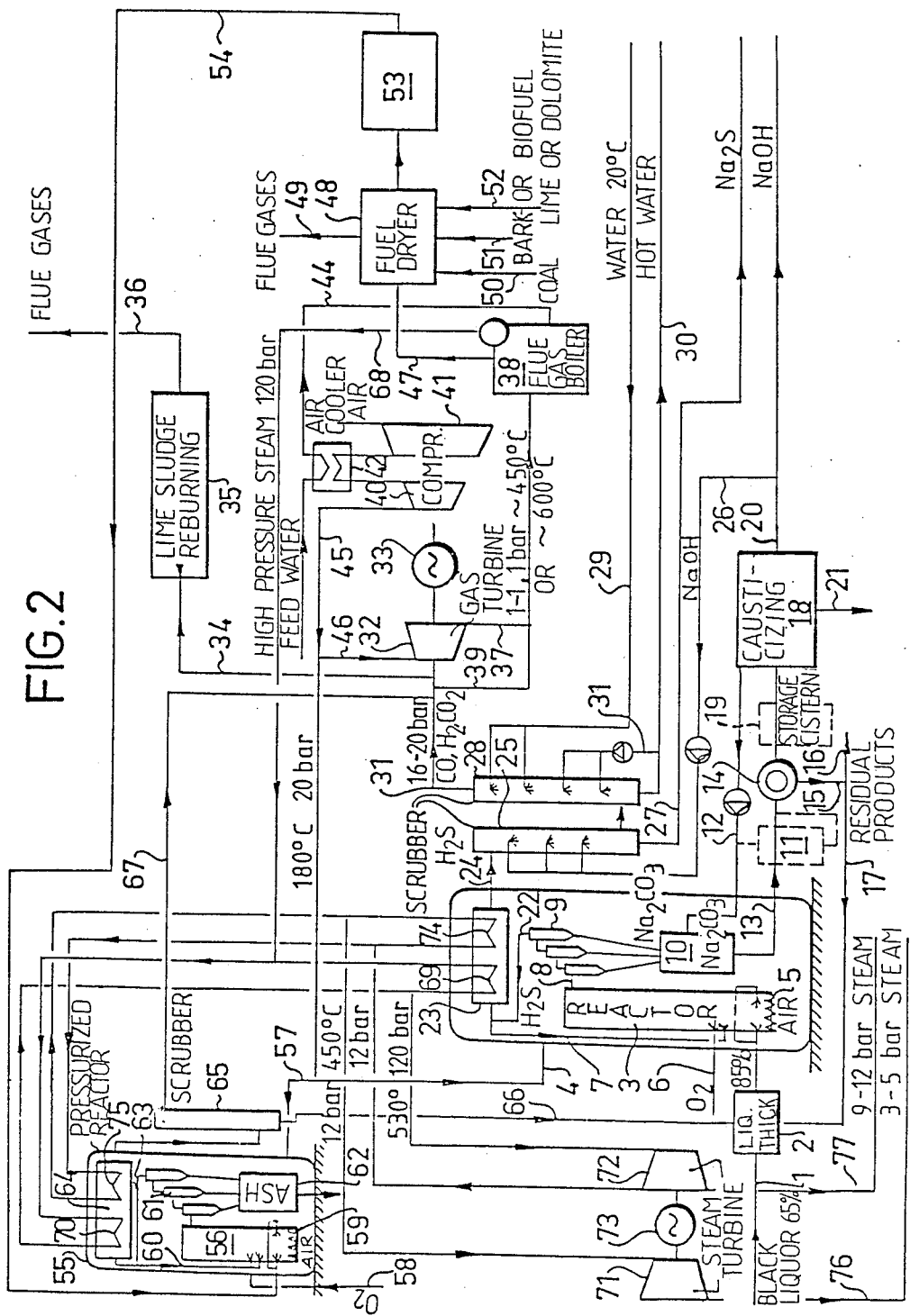
FIG. 2 shows schematically the design of a plant for carrying out the process of the invention.

In FIG. 2 there is shown schematically a possible design of a plant for carrying out the process of the invention for a maximum recovery of energy and digesting chemicals. The plant is primarily intended to be connected to a sulfate pulping process, but it can also be adapted to any other chemical pulping process. The modifications then required are clearly apparent for one skilled in the art.

The black liquor supplied has a solids content of about 65% and is supplied through the conduit 1 to a liquor thickener 2 where it is concentrated up to a solids content of about 85% och then injected into the pressurized reactor 3.

In the reactor 3, being under pressure above atmospheric the liquor is thermally decomposed with supply of a determined amount of air through the conduit 4 and the inlet 5 and possibly also with supply of oxygen gas or oxygen-enriched air through the conduit 6. Part of the combustible gases formed in the decomposition can be recycled through the conduit 7 and used as supporting fuel. In the decomposition, the liquor forms a solid phase substantially consisting of sodium carbonate and a gas phase substantially consisting of $H_2S$, $CO$, $CO_2$, $H_2$, $H_2O$, $CH_4$, and other gases.

The reaction products are led away from the reactor 3 through the conduit 8 to a separator 9 which preferably consists of a number of cyclones collected in a battery. The solid material is collected in a container 10, which can also be arranged outside the pressurized reactor shell as indicated by dashed lines at 11. In the container 10 or 11 the sodium carbonate is dissolved by means of an aqueous liquid which is supplied through the conduit 12, and dissolved material and solid impurities are discharged through the conduit 13 to a pressure filter 14 where solids are separated and carried away through the conduit 15. This material can go to waste through the conduit 16 for residual products or be recycled through the conduit 17 to the liquor thickener 2 in order to be subjected to the thermal decomposition again.

The liquid phase obtained from the pressure filter 14 and which substantially consists of sodium carbonate in solution is led to a causticizing plant 18, optionally via a storage tank 19 for balancing variatious in the material supply. The causticing plant 18 can be of a conventional design or a plant for causticizing at superatmospheric pressure, as is described in Swedish Pat. No. 419 997. A sodium hydroxide solution is obtained from the causticizsing plant 18 and is led away through the conduit 20 for preparation of fresh white liquor, and lime sludge which is led away through the conduit 21 to a lime kiln to be reburnt. The weak liquor solution obtained in washing of the lime sludge in the causticising plant is led away through the conduit 12 and is used for dissolution of the sodium carbonate and other soluble components from the thermal decomposition of the black liquor in the reactor 3.

The gas phase obtained from the separator 9 is led through the conduit 22 to a heat exchanger 23 for superheating of steam and then through the conduit 24 to a first scrubber 25. Herein the hydrogen sulfide and other possible sulfur compounds in the gas are absorbed by a solution of sodium hydroxide which is supplied through the conduit 26 which is a branch line from the conduit 20 for outgoing sodium hydroxide solution from the causticizing plant 18. In the absorption, sodium sulfide solution is formed which is led away through the conduit 27 to the preparation of white liquor.

Thus, by the method of the invention it has here become possible to obtain in the recovery of chemicals a division into a stream rich in sulfide and one rich in hydroxide/carbonate. This is of an essential importance and is a great advantage, as a considerable flexibility in the preparation of the digesting liquor is then obtained. It will also be possible in an easy way to modify the digestion of pulp so that it is started with a high sulfidity and finished with a lower one. This has been found to give good results with respect to the resulting pulp yield and the strength of the pulp.

After the absorption of hydrogen sulfide, the gases are washed in a second scrubber 28 with water which is supplied through the conduit 29. This water preferably has about room temperature. In the washing, hot water is obtained which is led away through the conduit 30 for use in the pulping process in some suitable way. A part of the hot water can be recycled through the conduit 31 for washing the gases when they enter the scrubber.

The washed and simultaneously cooled gas is led away from the scrubber through the conduit 31 to a gas turbine 32 driving an electric generator 33. Part of the gas can be diverted through the branch conduit 34 to be used as a fuel in a lime kiln 35 and then escapes as flue gases through the conduit 36. As sulfur compounds have already been removed previously from the fuel gas entering the lime kiln, the flue gases can mostly be discharged directly without further purification.

The exhaust gases are led from the gas turbine 32 through the conduit 37. These gases now have a pressure near atmospheric and a very high temperature and their heat energy is utilized in a gas boiler furnace 38 for generation of high pressure steam. Part of the fuel gases can be led past the gas turbine through the bypass conduit 39 and be used as a supporting fuel in the gas furnace, if required. High pressure steam is obtained from the gas boiler and steam is led away through the conduit 68 in order to perform work in a steam turbine after superheating, as will be described in greater detail in the following.

The gas turbine 32 also drives a compressor which is preferably divided into two stages 40 and 41 with an intermediate air cooler 42. In this air cooler the air is heat exchanged against feed water which is led through the conduit 44 to the gas boiler 38. The compressed air is led away from the compressor through the conduit 45, and part thereof is led through the branch line 46 to the combustion of the fuel gas in the gas turbine 32. The remainder of the compressed air is led to the reactor 3 for the thermal decomposition of the black liquor and to a reactor for pressure gasification of fuel, as is described more closely in the following.

The exhaust gases from the gas boiler furnace are led away through the conduit 47 to a dryer 48 for fuel and, finally, as flue gases through the conduit 49. These flue gases are also substantially free of sulfur compounds and they therefore usually need not be subjected to any further purification.

The heat energy of the flue gases is utilized in the dryer 48 for drying of fuel which can be of a varying type. Thus, the fuel can consist of carbon or bark or some other biofuel such as wood waste, straw, peat, etc., which are supplied as shown at 50 and 51. Furthermore, lime or dolomite is supplied at 52 in order to bind possibly appearing sulfur compounds in the following combustion and to give a type of ashes with suitable handling properties. The dried material is thereafter led to a suitable disintegrator 53, for example a mill, where it is finely divided into a suitable particle size.

The finely divided fuel mixture is thereafter led away through the conduit 54 to a plant 55 for gasification under pressure. This plant comprises a reactor 56 in which the fuel mixture supplied is thermally decomposed or gasified with access of oxygen and at a pressure above atmospheric. The gasification is preferably carried out at a temperature of 700°–1000° C., preferably 750°–875° C., and a pressure of 10–50 bar, preferably 15–25 bar. In the gasification, air is supplied through the branch line 57 from the compressed air conduit 45 and the compressor 40. If desired, oxygen in the form of pure oxygen gas or oxygen-enriched air can also be supplied through the conduit 58. The air is introduced into the reactor 56 through the inlet 59. As a supporting fuel in the gasification process, part of the combustible gas formed in the reaction can also be recycled through the conduit 60.

In the gasification reaction, combustible gases and ashes are primarily formed. These are separated in a separator 61 which preferably consists of a battery of cyclones, and the ashes are collected in the container 62 in order to be led away thereafter to disposal. The gases are led from the separator through the conduit 63 to a heat exchanger 64 in which their heat is utilized for superheating steam, and then to a scrubber 65 where they are washed for removal of remaining solids and condensed liquid materials such as tar. The washing liquid used, which usually consists of water, is thereafter recycled together with the recovered material through the conduit 66 to the liquor thickener 2 where it is combined with the incoming black liquor and concentrated in order to be subjected thereafter to the thermal decomposition in the reactor 3. In this way the recovered organic material and its content of energy can be utilized.

The washed gases from the scrubber 65 are thereafter led away through the conduit 67 and combined with the gases in the conduits 31 from the thermal decomposition of the black liquor before the combined gases are led to the gas turbine 32.

The high pressure steam obtained from the gas boiler 38 through the conduit 68 is led to superheating in a first stage 69 and 70, respectively, in the heat exchangers 23 and 64, respectively, in the reactor for thermal decomposition of the black liquor and the pressure reactor 55, respectively, for the fuel gasification. After the superheating in the first stage, the steam is led to a steam turbine which is preferably divided into two stages 71 and 72 and drives an electric generator 73. The steam is superheated between the two stages in the steam turbine in further superheating stages 74 and 75, which are also arranged in the heat exchangers 23 and 64, respectively. Process steam can thereafter also be obtained from the two turbine stages at a low and medium pressure and be carried away through the conduits 76 and 77, for other requirements in the pulping plant.

Suitable values of pressure and temperature for the essential material flows have also been indicated in the drawing FIG. 2. It should be noted that these values are only examples and have no limiting meaning with respect to the scope of protection of the invention.

As indicated above, FIG. 2 shows a fundamental scheme of the design of a plant for carrying out the process of the invention. The elements shown in the scheme such as reactors, separators, heat exchangers, gas and steam turbines etc. are of a design conventional per se, and their construction in detail is within the competence of one skilled in the art when the various process parameters have been established. This also applies to the choice of suitable materials for the construction of the various apparatuses included. A plant according to the invention further comprises a considerable number of machine elements of standard types such as valves, pipelines, measuring instruments with associated sensors etc. The embodiment and the detailed positioning of these elements have not been shown on the drawing, and it is also within the competence of one skilled in the art to arrange them where they are required.

A number of important advantages over the conventional technology for recovering energy and chemicals in pulping processes are achieved by the present invention. Thus, a higher degree of reduction can be obtained in the thermal decomposition of the black liquor. Moreover, the stream of chemicals from the process can easily be divided into a stream of sulfide and a stream of hydroxide, whereby a high degree of flexibility is obtained in the preparation of the white liquor for the pulp digestion. This in turn brings a higher digestion yield, an easier control of the digestion process, a shorter digestion time and a simplified washing of the pulp after digestion. As to the recovery of energy, a considerably larger amount of energy can be recovered as compared with the prior art, as a gas turbine is used and a higher steam pressure to the steam turbine can be obtained.

Recovery of energy from wood waste, bark and another biofuels can be integrated in the process in a natural way. Moreover, the costs of material and maintenance will be lower, as a number of components that have been essential in the prior art can now be omitted. This applies to such components as air blowers, flue gas blowers and electrofilters with the handling of dust, as a pressurized fuel gas is used which is free of dust and sulfur. As a result of this, the corrosion of materials will be less. From an environmental point of view, a plant according to this invention is also clearly superior to a conventional one and the interior working environment will also be completely free from dust and gases when it is operated with a gas-tight system under pressure. Further, as no melt is formed, the risk of melt-water explosions is also completely eliminated.

In this description and drawing the utilization of the process of the invention in a sulfate pulping process has primarily been shown. However, this is only an example of a preferred embodiment of the invention and has no limiting meaning. The invention can also be utilized for the recovery of energy and chemicals in other types of pulping processes, and there are no difficulties for a person skilled in the art, on the basis of what is already known about the processes, to make the modifications as to equipment and working conditions required in each specific case. The basic idea of the invention is the same all the time and is only restricted by the scope of the claims.

We claim:

1. A process for recovering energy and chemicals from spent liquor containing organic materials in pulp preparation, said liquor being thermally decomposed after concentration, forming gaseous and solid products and energy being recovered from the gases, the process comprising: concentrating said spent liquor containing organic materials; and thermally decomposing said concentrated spent liquor, wherein said thermal decomposition is carried out in a single step at a supply of oxygen in an amount corresponding to from 5 to 75% of the stoichiometric amount required for a complete oxidation, at a pressure of from 10 to 50 bar and at a temperature of from 700° to 850° C. such that no melt is formed, wherein the formation of carbon from included organic materials is suppressed and wherein the thermal decomposition forms sulfur-containing gases which are recovered by being absorbed in an alkaline solution.

2. The process of claim 1, wherein the spent liquor originates from a sulfate pulping process.

3. The process of claim 1, further comprising the gases from the thermal decomposition are washed and then are made to perform work by being combusted in a gas turbine and subsequently said gases give off energy in a flue gas boiler which generates steam.

4. The process of claim 3, further comprising the exhaust gases from the flue gas boiler are used for drying and heating one or more fuels which are thereafter thermally decomposed with a supply of oxygen in a gas generator at a pressure above atmospheric to form combustible gases which are combined with the washed gases 5. The process of claim 4, further comprising the gas turbine drives a compressor compressing an oxygen-containing gas which is thereafter led to the thermal decomposition of the residual liquor and to the gas generator.

6. The process of claim 3, further comprising the steam from the flue gas boiler is heat exchanged against the gases from the thermal decomposition and is thereafter made to perform work in a steam turbine.

7. The process of claim 1, wherein said temperature is from 740° to 800° C.

8. The process of claim 1, wherein said pressure is from 15 to 25 bar.

9. The process of claim 1, wherein said oxygen is supplied in the thermal decomposition in an amount corresponding to from 30 to 50% of the stoichiometric amount required for a complete oxidation.

* * * * *